United States Patent
Leone et al.

(10) Patent No.: US 10,286,755 B2
(45) Date of Patent: May 14, 2019

(54) SYSTEM AND METHODS FOR EXTRACTING WATER FROM A HVAC SYSTEM FOR WATER INJECTION

(71) Applicant: Ford Global Technologies, LLC, Dearborn, MI (US)

(72) Inventors: Thomas G. Leone, Ypsilanti, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 218 days.

(21) Appl. No.: 15/272,111

(22) Filed: Sep. 21, 2016

(65) Prior Publication Data
US 2018/0079281 A1  Mar. 22, 2018

(51) Int. Cl.
| B60H 1/32 | (2006.01) |
| F02D 41/00 | (2006.01) |
| F02D 41/26 | (2006.01) |
| F02M 25/028 | (2006.01) |
| F02M 25/03 | (2006.01) |
| F02M 25/022 | (2006.01) |

(52) U.S. Cl.
CPC ....... *B60H 1/3233* (2013.01); *F02D 41/0025* (2013.01); *F02D 41/26* (2013.01); *F02M 25/028* (2013.01); *F02M 25/0222* (2013.01); *F02M 25/03* (2013.01); *B60H 2001/3245* (2013.01); *B60H 2001/3255* (2013.01); *B60H 2001/3266* (2013.01); *B60H 2001/3272* (2013.01); *B60H 2001/3282* (2013.01)

(58) Field of Classification Search
CPC .......... B60H 1/3233; F02M 25/022–25/0224; F02M 25/028; F24F 2013/228; F24F 13/22; F24F 3/1405; E03B 3/28

USPC .................. 62/279, 272, 277, 150
See application file for complete search history.

(56) References Cited

U.S. PATENT DOCUMENTS

| 6,026,641 | A | 2/2000 | Liberty |
| 8,701,427 | B2 | 4/2014 | Yelles |
| 9,291,125 | B2 | 3/2016 | Yoshihara et al. |
| 2006/0000597 | A1 | 1/2006 | Errington et al. |
| 2010/0121559 | A1 | 5/2010 | Bromberg et al. |

(Continued)

FOREIGN PATENT DOCUMENTS

EP    2607647 A1   6/2013

OTHER PUBLICATIONS

Leone, Thomas G., et al., "Method and System for Controlling Water Injection," U.S. Appl. No. 15/216,497, filed Jul. 21, 2016, 47 pages.

(Continued)

*Primary Examiner* — Cassey D Bauer
(74) *Attorney, Agent, or Firm* — Julia Voutyras; McCoy Russell LLP (57) ABSTRACT

Methods and systems are provided for adjusting a position of an air recirculation valve of a HVAC system to adjust a ratio of ambient to recirculated air routed to an AC evaporator to collect condensed water for water injection into an engine. In one example, a method may include adjusting the position of the air recirculation valve of the HVAC system based on a water level in a water storage tank of the water injection system. Further, the method may include adjusting the position of the air recirculation valve of the HVAC system based on a determined humidity of the ambient air and a determined humidity of the recirculated air.

19 Claims, 6 Drawing Sheets

(56) References Cited

U.S. PATENT DOCUMENTS

| | | |
|---|---|---|
| 2011/0048039 A1 | 3/2011 | Kohavi et al. |
| 2011/0174267 A1 | 7/2011 | Surnilla et al. |
| 2013/0218438 A1 | 8/2013 | Surnilla et al. |
| 2013/0291580 A1 | 11/2013 | Lindner |
| 2014/0366508 A1 | 12/2014 | Ulrey et al. |

OTHER PUBLICATIONS

Miller, Kenneth James, et al., "Method and System for Engine Water Injection," U.S. Appl. No. 15/258,914, filed Sep. 7, 2016, 47 pages.

Leone, Thomas G., et al., "Method and System for Controlling Water Injection," U.S. Appl. No. 15/216,525, filed Jul. 21, 2016, 63 pages.

Leone, Thomas G., et al., "Method and System for Controlling Water Injection," U.S. Appl. No. 15/285,311, filed Oct. 4, 2016, 54 pages.

Leone, Thomas G., et al., "System and Methods for Extracting Water from an Electric Air Conditioning System for Water Injection," U.S. Appl. No. 15/271,954, filed Sep. 21, 2016, 51 pages.

Leone, Thomas G., et al., "System and Methods for Extracting Water from a Mechanical Air Conditioning System for Water Injection," U.S. Appl. No. 15/272,017, filed Sep. 21, 2016, 44 pages.

Bohm, Martin, et al., "Approaches for On-board Water Provision for Water Injection," ATZ Worldwide 2016, vol. 118, pp. 54-57, 4 pages.

SYSTEM AND METHODS FOR EXTRACTING WATER FROM A HVAC SYSTEM FOR WATER INJECTION

FIELD

The present description relates generally to methods and systems for a heating, ventilation, air conditioning (HVAC) system and a water injection system of an engine.

BACKGROUND/SUMMARY

Internal combustion engines may include water injection systems that inject water from a storage tank into a plurality of locations, including an intake manifold, upstream of engine cylinders, or directly into engine cylinders. Injecting water into the engine intake air may increase fuel economy and engine performance, as well as decrease engine emissions. When water is injected into the engine intake or cylinders, heat is transferred from the intake air and/or engine components to the water. This heat transfer leads to evaporation, which results in cooling. Injecting water into the intake air (e.g., in the intake manifold) lowers both the intake air temperature and a temperature of combustion at the engine cylinders. By cooling the intake air charge, a knock tendency may be decreased without enriching the combustion air-fuel ratio. This may also allow for a higher compression ratio, advanced ignition timing, and decreased exhaust temperature. As a result, fuel efficiency is increased. Additionally, greater volumetric efficiency may lead to increased torque. Furthermore, lowered combustion temperature with water injection may reduce NOx, while a more efficient fuel mixture may reduce carbon monoxide and hydrocarbon emissions. As mentioned above, water may be stored in a vehicle to provide water for injection on demand. However, in order to meet the water injection demands of an engine, a vehicle needs to have a sufficient supply of water. In one example, a water storage tank of a water injection may be manually refilled by a vehicle operator. However, in some situations, water for refilling the tank may not be readily available and having to re-fill the tank may be undesirable for the operator.

Other approaches to refilling a water storage tank includes collecting water (or condensate) from other vehicle systems on-board the vehicle, such as collecting water from an air conditioning (AC) of a heating, ventilation, and air conditioning (HVAC) system. For example, the approach shown by John Michael Ette in EP2607647 A1 includes extracting water from an HVAC system. Therein, collecting condensate is based on an amount of water stored in a water storage reservoir (e.g. tank) and favorable ambient conditions. Condensate is collected from an HVAC system when an ambient temperature is high and a water storage tank level is below a level for water injection demand. However, the inventors have recognized potential issues with such methods. In particular, collecting water from an HVAC system only when ambient conditions are conducive for condensate production may be insufficient to meet the water injection demands of an engine. Further, operating an AC compressor of the HVAC system when ambient conditions are favorable but AC has not been requested in order to collect condensate may require additional fueling and diminish the fuel economy benefit of water injection.

In one example, the issues described above may be addressed by a method for a vehicle including adjusting a position of an air recirculation valve of a HVAC system of the vehicle to vary a ratio of fresh ambient air to recirculated cabin air routed through an AC evaporator of the HVAC system based on level of water in a water reservoir coupled to a water injection system. A water injection system, including the water reservoir, may be fluidly coupled to the HVAC system. Thus, when the AC compressor is run (e.g., as the AC compressor load increases), the HVAC recirculation valve may be adjusted and water may be collected from the AC system of the HVAC system. The position of the HVAC recirculation valve may be adjusted to adjust the ratio of ambient to recirculated air directed to the AC evaporator based on a determined ambient air humidity and recirculated air humidity in response to a water level in the water reservoir. Collected water is then stored at the water reservoir for use in the water injection system. In this way, the air recirculation valve is adjusted while the AC compressor is running to collect water for a water injection system, thereby providing water for injection via the injection system. For example, adjusting the position of the HVAC air recirculation valve may include decreasing a ratio of ambient air to recirculated cabin air to increase an amount of recirculated cabin air routed through the AC evaporator, in response to the water level in the water reservoir (e.g. tank) being less than a threshold level and a determination of a higher recirculated air humidity relative to an ambient air humidity. Additionally, this may include adjusting a position of the HVAC recirculation to a position that is different from a vehicle operator selected position based on a desired position for water collection and cycling the AC compressor to provide a passenger requested cabin temperature. In this way, the position of the HVAC air recirculation valve may be adjusted during AC operation in order to increase an amount of condensate collected. As a result, a greater quantity of condensate may be collected from the HVAC system over a wider range of vehicle and ambient operating conditions to provide water for the water injection system. Additionally, the water level in the water reservoir of the water injection system may be replenished automatically without manual filling and may be maintained at sufficient levels for water injection system operation. Further, by reducing the likelihood of running out of water or running the AC compressor for water collection when AC is not requested, more water may be available for water injection and/or less power may be consumed by the AC compressor, thereby improving fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
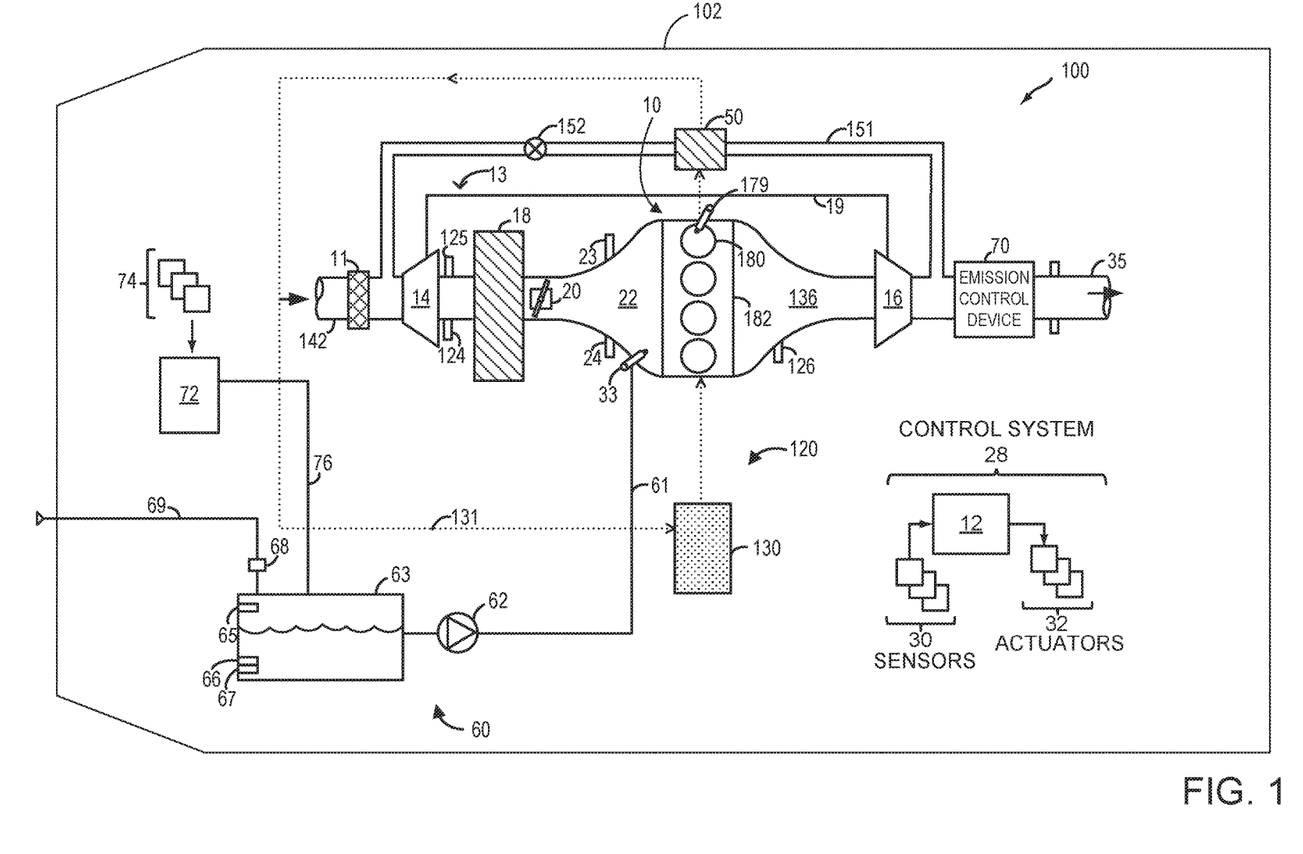
FIG. 1 shows a schematic diagram of an engine system including a water injection system.
Figure 2:
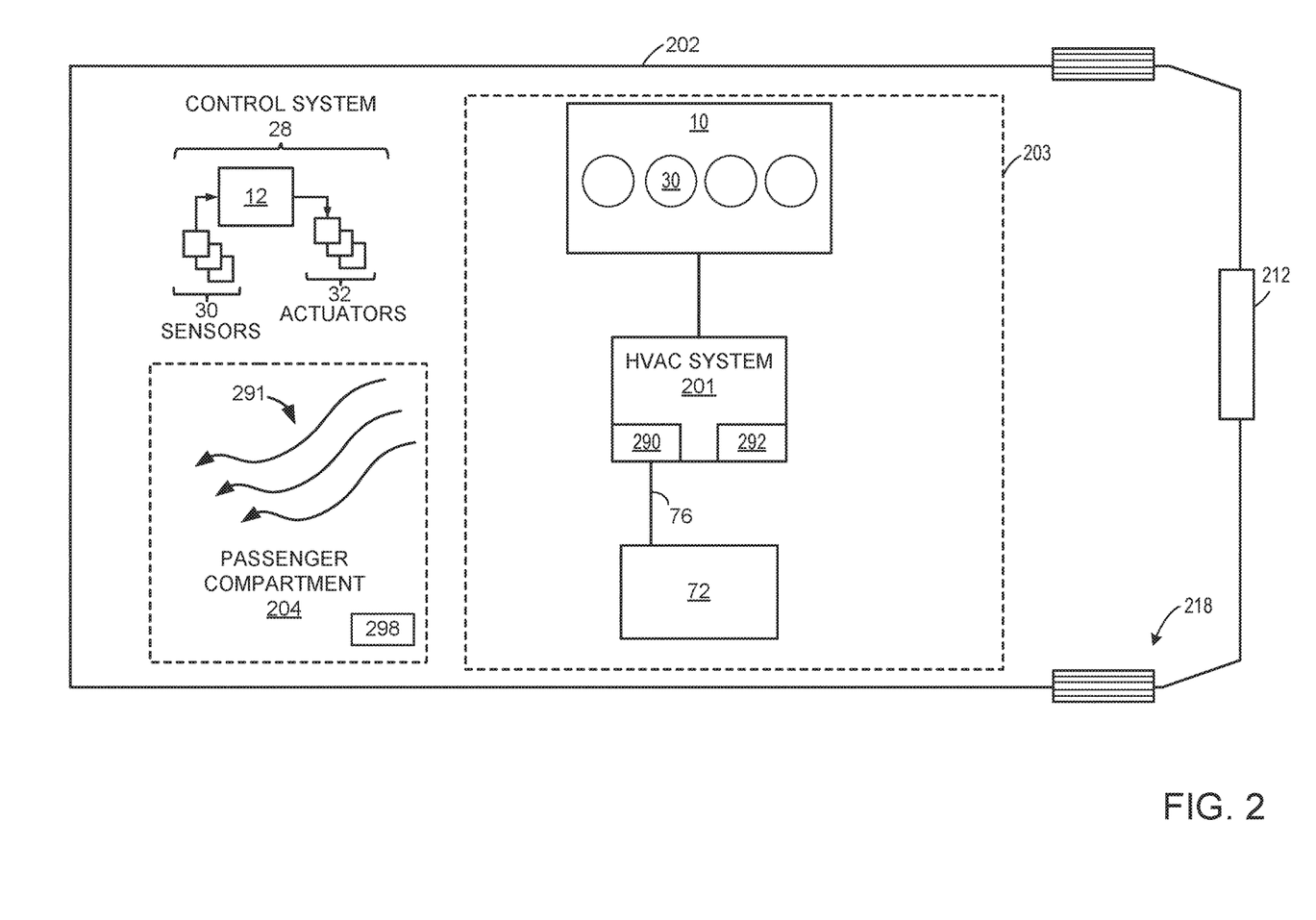
FIG. 2 shows a schematic diagram of a vehicle system including a water injection system, a heating, ventilation, and air conditioning (HVAC) system, and an engine.
Figure 3:
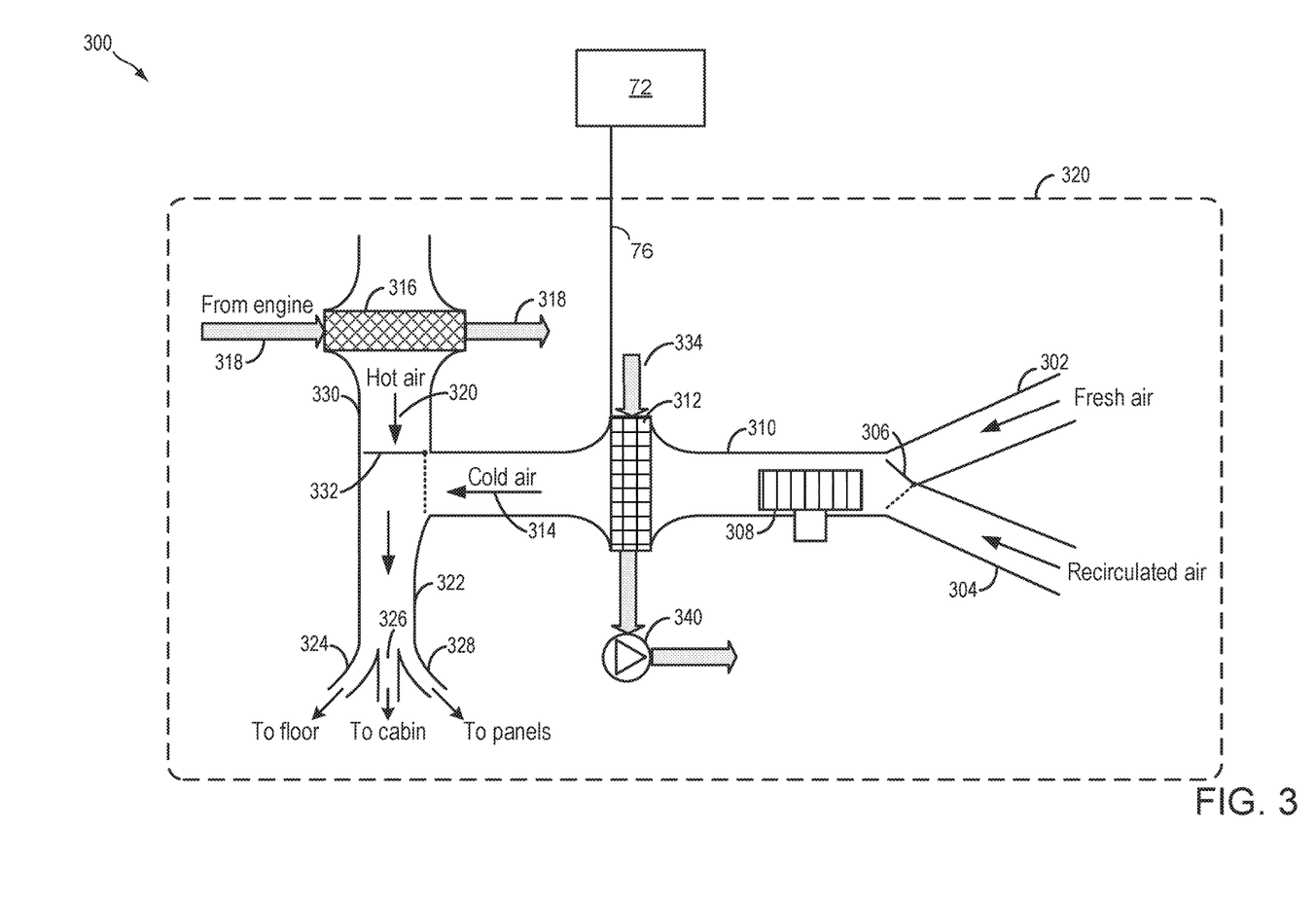
FIG. 3 shows an example embodiment of an HVAC system and a water collection system.
Figure 4:
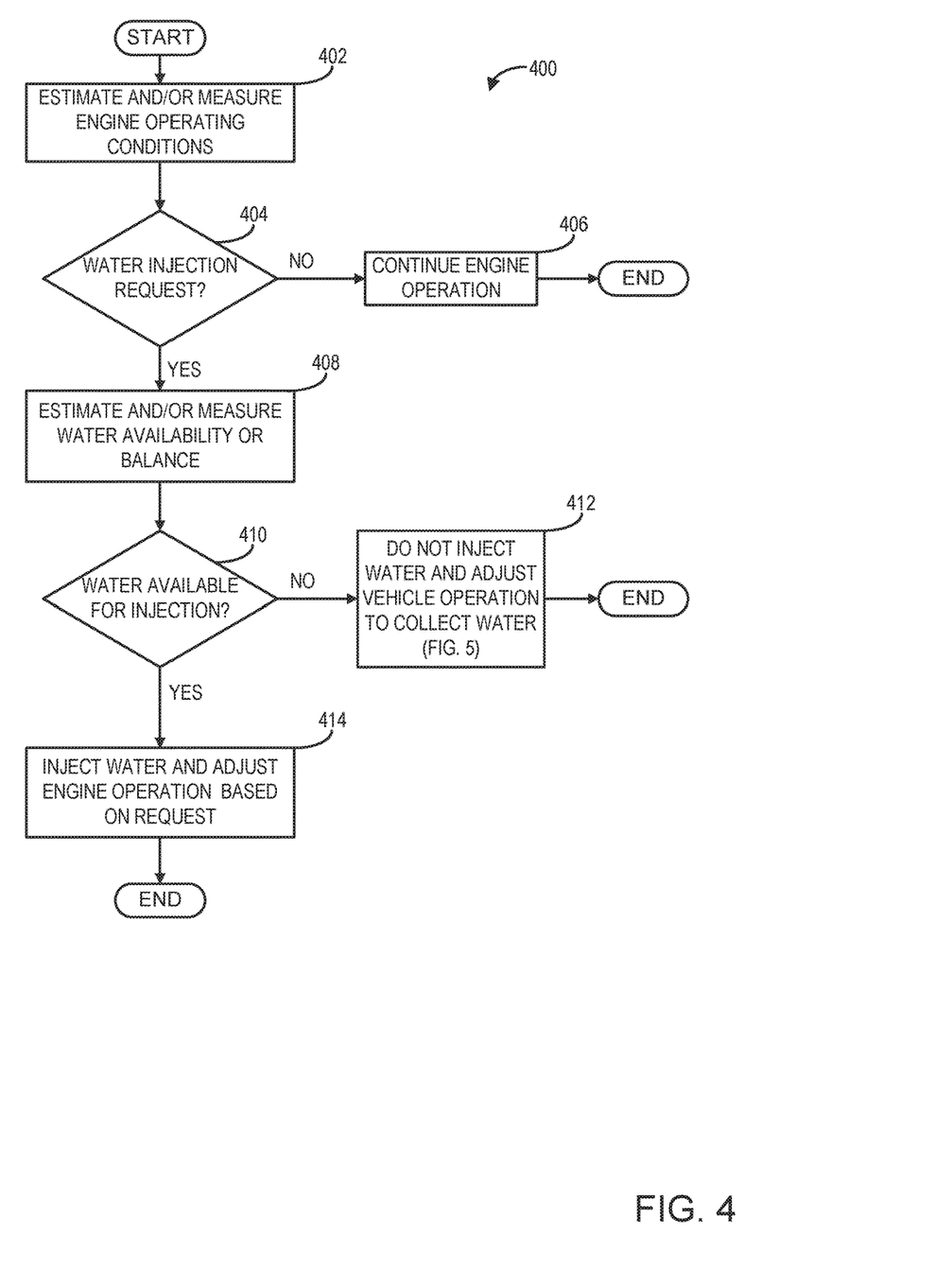
FIG. 4 shows a flow chart of a method for injecting water into an engine based on an injection request.
Figure 5:
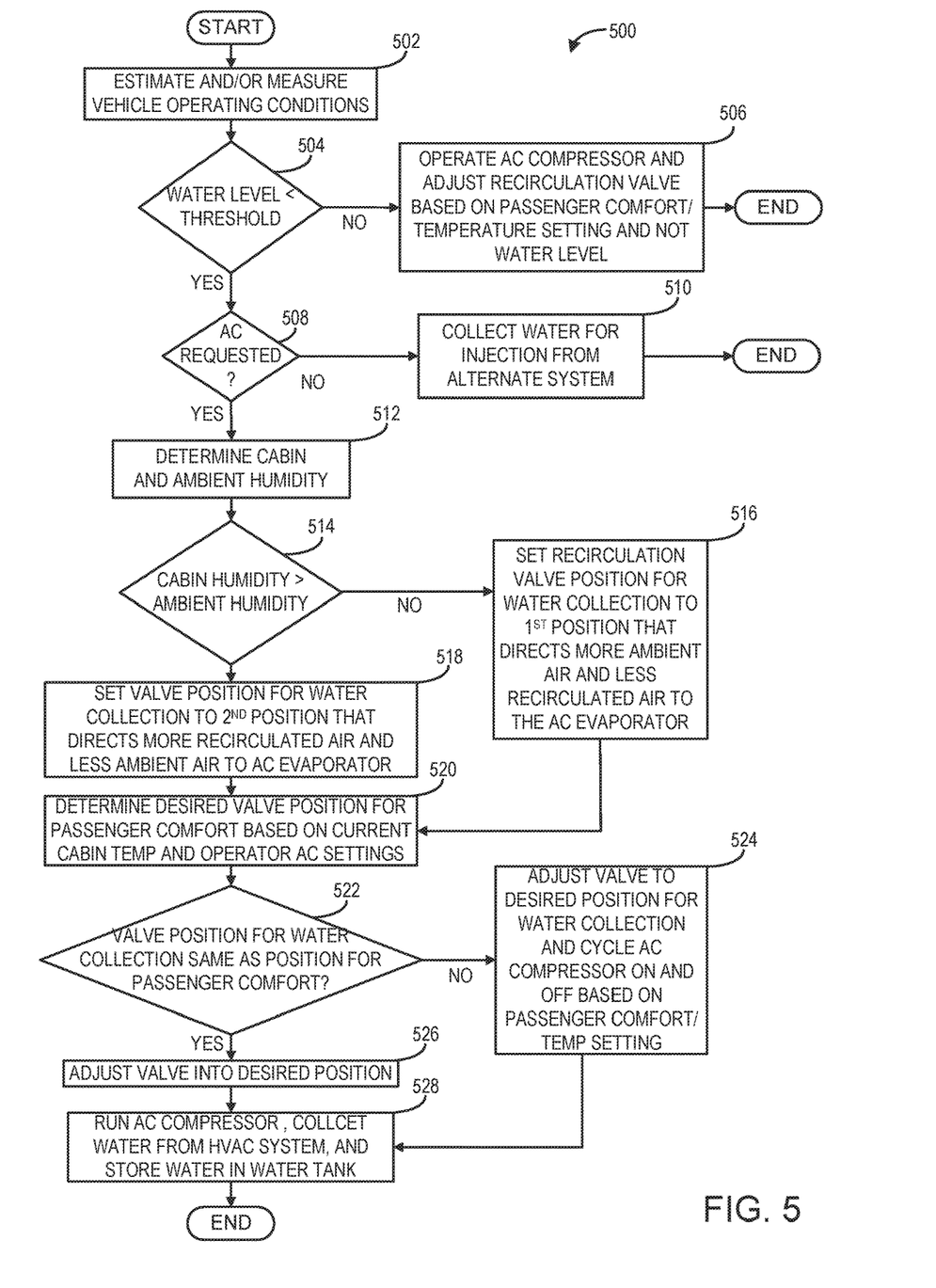
FIG. 5 shows a flow chart of a method for collecting condensate from an HVAC system and storing extracted condensate for water injection at an engine.

The following description relates to systems and methods for adjusting a position of an HVAC recirculation valve of an HVAC system to alter the ratio of ambient to recirculated air directed to an AC evaporator based on the water level in a water storage tank of a vehicle system. When an AC compressor is running, the position of the HVAC recirculation valve may be adjusted to collect water for injection into an engine from the HVAC system. The position of the HVAC recirculation valve may be adjusted to a position that directs more ambient air through the AC evaporator based on a higher determined ambient air humidity relative to a recirculated air humidity. Conversely, the position of the HVAC recirculation valve may be adjusted to a position that directs more recirculated air through the AC evaporator based on a higher determined recirculated air humidity relative to an ambient air humidity. Collected water may be stored in the water storage tank of a water collection system and then injected via one or more water injectors coupled with the engine. A schematic depiction of an example engine system, including a water collection system that receives collected condensate from an HVAC system and injects the collected water into the engine, is shown in FIG. 1. In FIG. 2, a schematic depiction of an example vehicle system is shown, including substantially the same engine system and water injection system as the one shown in FIG. 1. Additionally, FIG. 2 shows coupling amongst the HVAC system, the engine, and the water collection system. By adjusting the ratio of ambient to recirculated air directed to the AC evaporator during HVAC operation based on the determined humidity of the ambient and recirculated air and the water level in the water storage tank, water may be collected from HVAC system to refill the water storage tank in the water injection system in order to provide water for water injection into the engine. In FIG. 3, a schematic depiction of an example HVAC system is shown, which is substantially the same as the HVAC system shown in FIG. 2 that is coupled to engine and water injection systems. FIGS. 4-5 illustrate example methods for collecting condensate from the HVAC system by adjusting the position of the HVAC recirculation valve to adjust the ratio of ambient to recirculated air directed to the AC evaporator. Specifically, FIG. 4 shows a method for determining whether to inject water into an engine based on engine operating conditions. FIG. 5 shows a method for collecting water (e.g., condensate or condensed water) from the HVAC system by adjusting the position of the HVAC recirculation valve in response to a water level in the water storage tank and the determined cabin and ambient air humidity. In one example, the HVAC recirculation valve may be set to a position desired for water collection based on the cabin air humidity and recirculated air humidity and an AC compressor of the HVAC may be cycled based on a vehicle operator request to increase the water collection amount in response to a low water level in the water storage tank and maintain passenger comfort settings. Finally, FIG. 6 graphically depicts adjustments to the position of the HVAC recirculation valve of the HVAC system in response to water storage tank level. For example, during HVAC operation, the HVAC recirculation valve may be commanded to a position that directs more ambient air and less recirculated air to the AC evaporator in response to a determined humidity of the ambient air being higher than that of the recirculated air. As a result, increased water may be collected from the AC system for injection via the water injection system. In this way, water condensate collection parameters may be adjusted based on the water level in the water storage tank and water injection demands of the engine. As a result, the water storage tank may be automatically refilled from condensate collected from the HVAC system for subsequent use in a water injection system.

Turning to the figures, FIG. 1 shows an embodiment of a water injection system 60 and an engine system 100, in a motor vehicle 102, illustrated schematically. In the depicted embodiment, engine 10 is a boosted engine coupled to a turbocharger 13 including a compressor 14 driven by a turbine 16. Specifically, fresh air is introduced along intake passage 142 into engine 10 via air cleaner 11 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve (e.g., intake throttle) 20. The CAC may be an air-to-air or air-to-coolant heat exchanger, for example. Throttle valve 20 is coupled to engine intake manifold 22. From the compressor 14, the hot compressed air charge enters the inlet of the CAC 18, cools as it travels through the CAC, and then exits to pass through the throttle valve 20 to the intake manifold 22. In the embodiment shown in FIG. 1, the pressure of the air charge within the intake manifold is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers or cylinders 180 through a series of intake valves (not shown). As shown in FIG. 1, the intake manifold 22 is arranged upstream of all combustion chambers 180 of engine 10. Sensors such as manifold charge temperature (MCT) sensor 23 and air charge temperature sensor (ACT) 125 may be included to determine the temperature of intake air at the respective locations in the intake passage. In some examples, the MCT and the ACT sensors may be thermistors and the output of the thermistors may be used to determine the intake air temperature in the passage 142. The MCT sensor 23 may be positioned between the throttle 20 and the intake valves of the combustion chambers 180. The ACT sensor 125 may be located upstream of the CAC 18 as shown, however, in alternate embodiments, the ACT sensor 125 may be positioned upstream of compressor 14. The air temperature may be further used in conjunction with an engine coolant temperature to compute the amount of fuel that is delivered to the engine, for example.

The combustion chambers are further coupled to exhaust manifold 136 via a series of exhaust valves (not shown). In the depicted embodiment, a single exhaust manifold 136 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 136 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow. In one example, emission control device 70 may include a three-way catalyst (TWC).

All or part of the treated exhaust from emission control device 70 may be released into the atmosphere via exhaust conduit 35. Depending on operating conditions, however, some exhaust may be diverted instead to an exhaust gas recirculation (EGR) passage 151, through EGR cooler 50 and EGR valve 152, to the inlet of compressor 14. In this manner, the compressor is configured to admit exhaust tapped (e.g. taken) from downstream of turbine 16. The EGR valve 152 may be opened to admit a controlled amount of cooled exhaust gas to the compressor inlet for desirable combustion and emissions-control performance. In this way, engine system 100 is adapted to provide external, low-pressure (LP) EGR. In other embodiments, the EGR system may be a high pressure EGR system with EGR passage 151 connecting from upstream of the turbine 16 to downstream of the compressor 14. In some embodiments, the MCT sensor 23 may be positioned to determine the manifold charge temperature, and may include air and exhaust recirculated through the EGR passage 151.

The combustion chambers 180 are capped by cylinder head 182 and coupled to fuel injectors 179 (while only one fuel injector is shown in FIG. 1, each combustion chamber includes a fuel injector coupled thereto). Fuel may be delivered to fuel injector 179 by a fuel system (not shown) including a fuel tank, a fuel pump, and a fuel rail. Furthermore, combustion chamber 180 draws in water and/or water vapor, which may be injected into the engine intake by water injector 33. As shown in FIG. 1, the water injector 33 is positioned in the intake manifold 22, downstream of the throttle 20 and upstream of all the combustion chambers (e.g., cylinders) 180 of the engine 10. In another embodiment, water injector 33 may be positioned downstream of the throttle 20, in one or more intake runners (e.g., ports; not shown) leading to one of the combustion chambers 180, or in one or more combustion chambers 180 to inject water directly. In yet another embodiment, the water injection system water may include a plurality of water injectors positioned in one or more of these locations. For example, an engine may include each of a water injector positioned in an intake manifold 22, water injectors positioned at each intake runner, and water injectors positioned at each combustion chamber, in one embodiment. Water may be delivered to water injector 33 by the water injection system 60.

The water injection system 60 includes a water storage tank (or reservoir) 63, a water pump 62, and a water filling passage (e.g., manual water filling passage) 69. Additionally, water injection system 60 is coupled to water collection system 172, which extracts water (e.g., in the form of liquid condensate) from an air conditioning system, as described further below. Water stored in water storage tank 63 is delivered to water injector 33 via water passage 61. In another embodiment, water stored in water storage tank 63 may be delivered to multiple water injectors coupled to the intake, as previously described. In embodiments that include multiple injectors, water passage 61 may include one or more valves and water passages (not shown) to select between different water injectors or one or more water pumps each coupled to a water injector passage for one or more injectors. Water pump 62 may be operated by a controller 12 to provide water to water injector 33 via passage 61.

Water storage tank 63 may include a water level sensor 65, a water quality sensor 66, and a water temperature sensor 67, which may relay information to controller 12. For example, in freezing conditions, water temperature sensor 67 detects whether the water in tank 63 is frozen or available for injection. In some embodiments, an engine coolant passage (not shown) may be thermally coupled with storage tank 63 to thaw frozen water. The water quality sensor 66 may detect whether the water in water storage tank 63 is suitable for injection. As one example, water quality sensor 66 may be a conductivity sensor. The level of water stored in water tank 63, as identified by water level sensor 65, may be communicated to the vehicle operator and/or used to adjust engine operation. For example, a water gauge or indication on a vehicle instrument panel (not shown) may be used to communicate the level of water. In another example, the level of water in water tank 63 may be used to determine whether sufficient water for injection is available, as described below with reference to FIG. 3. In the depicted embodiment, water storage tank 63 may be manually refilled via water filling passage 69 and/or refilled automatically by the collection system 72 via water tank filling passage 76. Collection system 72 may be coupled to one or more components 74 that refill the water storage tank with condensate collected from various engine or vehicle systems. In one example, collection system 72 may be coupled with an EGR system to collect water condensed from exhaust passing through the EGR system. In another example, collection system 72 may be coupled with a heating, ventilation, and air conditioning (HVAC) system (as shown in FIGS. 2 and 3). Manual filling passage 69 may be fluidically coupled to a filter 68, which may remove small impurities contained in the water that could potentially damage engine components.

Additionally, engine 10 is thermally coupled to coolant system 120. Coolant system 120 may include radiator 130 as a heat exchanger. Warmer coolant (which may be water or other possible coolants) enters radiator 130 where heat is transferred from the coolant to the radiator. Then, cooled coolant exits radiator 130 and flows to engine components via coolant loop 131. (Dashed lines represent the flow of coolant in a loop and arrows indicate the direction of coolant flow). Coolant within loop 131 may circulate to the engine cylinder head 182 and/or EGR cooler 50. In the depicted embodiment, a single radiator with coolant loop 131 is shown. However, in some embodiments, the coolant system may be a dual-loop coolant system, which flows coolant to engine components via separate coolant loops, each loop with a radiator.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as transmission gear position, gas pedal input (e.g., pedal position), brake input, transmission selector position, vehicle speed, engine speed, mass airflow through the engine, boost pressure, ambient temperature, ambient humidity, intake air temperature, fan speed, etc.), cooling system sensors (such as ECT sensor, fan speed, passenger compartment temperature, ambient humidity, etc.), CAC 18 sensors (such as CAC inlet air temperature, ACT sensor 125 and pressure, CAC outlet air temperature, MCT sensor 23, and pressure, etc.), knock sensors 183 for determining ignition of end gases and/or water distribution among cylinders, water injection system sensors (such as water level sensor 65, water quality sensor 66, and water temperature sensor 67), and others. Furthermore, controller 12 may communicate with various actuators 32, which may include engine actuators (such as fuel injectors, an electronically controlled intake air throttle plate, spark plugs, water injectors, water pumps, etc.). In some examples, the storage medium (e.g., memory) may be programmed with computer readable data representing instructions executable by the processor for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller. For example, injecting water to the engine may include adjusting an actuator of injector 33 to inject water and adjusting water injection may include adjusting an amount or timing of water injected via the injector. In another example, collecting condensate for a water injection system 60 may include adjusting the operation of water collection system 72, such as an HVAC system.

FIG. 2 shows an example embodiment of an air conditioning system 290 coupled to a heating, ventilation, and air conditioning (HVAC) system 201 in a vehicle 202, illustrated schematically. The vehicle 202 shown in FIG. 2 may have similar elements to vehicle 102 shown in FIG. 1, such as engine 10 shown in FIG. 1. As such, similar components in FIG. 2 to those of FIG. 1 are labelled similarly and are not re-described below for the sake of brevity.

Vehicle system 202 includes an internal combustion engine 10 and HVAC system 201, which is coupled to a water collection system 72. Further, vehicle system 202 may include final drive/wheels 218, which may contact a road surface, a passenger compartment or cabin 204, and an under-hood compartment 203. Under-hood compartment 203 may house various under-hood components under the hood (not shown) of motor vehicle 202. For example, under-hood compartment 203 may house internal combustion engine 10. Internal combustion engine 10 has combustion chambers or cylinders 30.

HVAC system 201 may be configured to provide a climate-controlled air flow to a cabin or passenger compartment 204 through one or a plurality of vents 291. HVAC system 201 includes air conditioner 290 and radiator 292. In addition, HVAC system 201 may include various pumps, valves, and heat exchangers for circulating an appropriate cooling fluid, such as water, coolant, or another suitable fluid, through internal combustion engine 10 to absorb waste heat. The waste heat may be used to heat passenger compartment 204 (e.g., when cabin heating is requested). Additionally, or optionally, the waste heat may be dissipated from the vehicle to ambient air, for example, by operating radiator 292.

One or more blowers (not shown) and cooling fans may be included in HVAC system 201 to provide airflow assistance and augment a cooling airflow through the under-hood components. For example, a cooling fan coupled to radiator 292, may be operated when the vehicle is moving and the engine is running to provide cooling airflow assistance through radiator 292. The cooling fan may also draw a cooling airflow into under-hood compartment 203 through an opening in the front-end of vehicle 202, for example, through grill 212. Such a cooling air flow may then be utilized by radiator 292 and other under-hood components (e.g., fuel system components, batteries, etc.) to keep the engine and/or transmission cool. Further, in some examples, the air flow may be used to reject heat from air conditioner 290. Further still, additionally or alternatively, the airflow may be used to improve the performance of a turbocharged/supercharged engine that is equipped with intercoolers that reduce the temperature of the air that goes into the intake manifold/engine.

Further still, HVAC system 201 may include one or more auxiliary cooling devices (not shown) including a remote or stand-alone thermal control system. When included, the auxiliary device (or stand-alone system or remote thermal control system) may be located at the rear of the vehicle and may contain, as an example, a cooling pump or compressor, a condenser, cooling fan and lines connected to a vapor cooler inside a fuel tank of the vehicle's fuel system. The auxiliary or remote cooling system may be shared to cool other hardware, such as cooling a battery in a hybrid vehicle, or only used exclusively for cooling the fuel tank's vapor cooler.

HVAC system 201 is further fluidically coupled to water collection system 72, which is substantially similar to water collection system 72 shown in FIG. 1, to extract water from the air conditioner 290 for water injection into engine 10. Condensate forms at an evaporator (not shown) of air conditioner 290 as air is cooled. The condensate is then delivered to the water collection system 72 via a condensate drain (not shown) and water tank filling passage 76.

Air from HVAC system 201 may be directed to passenger compartment 204 through ventilation ducts 291, illustrated by arrows. Controller 12 directs air flow from HVAC system 201 to the passenger compartment 204 according to operator settings, which may be inputted using vehicle instrument panel 298, as well as climate sensors. Within the passenger compartment (e.g. cabin), a vehicle operator or passenger may input desired air conditioning parameters via a vehicle instrument panel 298. In one example, the vehicle instrument panel 298 may comprise one or more of input portions for receiving an operator input, such as buttons, touch screens, voice input/recognition, etc. In the depicted example, vehicle instrument panel 298 may include input portions for receiving operator input for the HVAC system 201 (e.g. on/off state of the air conditioning, desired passenger compartment temperature, fan speed, and distribution path for cabin air). Further, the vehicle instrument panel 298 may include one or more of indicator lights and/or a textbased display with which messages are displayed to an operator. In another example, a plurality of sensors 30 may include one or more climate sensors, which may indicate the temperature of an AC evaporator of HVAC system 201 and passenger compartment 204, as well as ambient temperature, to controller 12. Further, sensors 30 may include humidity sensors to measure the humidity of passenger compartment 204 and ambient air, as well as the humidity of air passed through HVAC system 201. The humidity sensors may measure absolute humidity, specific humidity, and/or relative humidity, where relative humidity may be determined as a ratio of vapor mass to saturated vapor mass or a ratio of actual vapor pressure to saturation vapor pressure at a given temperature.

FIG. 2 further shows a control system 28. Control system 28 is substantially similar to control system 28 shown in FIG. 1, including controller 12, which may receive input from a plurality of sensors 30 and may communicate with various actuators 32. The controller 12 receives signals from the various sensors of FIG. 2 and employs the various actuators of FIG. 2 to adjust engine operation based on the received signals and instructions stored on a memory of the controller. For example, collecting water from an HVAC system may include adjusting an air recirculation valve, as described further below with reference to FIG. 3, of an HVAC system, such as HVAC 201. The controller may receive signals from sensors, such as signals an ambient humidity level, a passenger compartment/cabin humidity level, a position of an air recirculation valve, or a water level in a water storage tank and may employ actuators of the air recirculation valve to adjust the position of the air recirculation valve. In one example, the controller may adjust the position of the air recirculation valve to a first position to direct more ambient air and less recirculated air to the AC evaporator in response to outputs from humidity sensors that indicate that ambient air has a higher humidity than the recirculated air. In another example, the controller adjust the position of the air recirculation valve to a second position to direct more recirculated air and less ambient air to the AC evaporator of an HVAC system, such as HVAC system 201, in response to outputs from humidity sensors that indicate that the humidity of the recirculated air is higher than that of the ambient air. Additionally, controller 12 may receive signals from instrument panel 298, such as a desired passenger compartment/cabin temperature or position of the air recirculation valve, and may adjust HVAC system 201 operation based on the received signals. In one example, the controller may adjust the position of the air recirculation valve in response to outputs from the instrument panel based on a desired position of the air recirculation valve.

Now turning to FIG. 3, an example embodiment 300 of the components and operation of a vehicle HVAC system 320 is described. In one example, the HVAC system 320 of FIG. 3 may be similar elements to the HVAC system 201 shown in FIG. 2 and may be used as the HVAC system in FIG. 2. As such, the temperature and flow of air supplied to the vehicle's cabin space may be adjusted by adjusting a ratio of hot air (generated using heating elements) and cold air (generated using cooling elements). HVAC system 320 includes a fresh/ambient air duct 302 for providing ambient or fresh air from outside the vehicle and a recirculated air duct 304 for providing recirculated air from inside the vehicle cabin/passenger compartment, such as passenger compartment 204 shown with reference to FIG. 2. A ratio of fresh air to recirculated air is adjusted by actuator 306 responsive to selected HVAC settings and water collection system demands. For example, when a higher proportion of recirculated air is needed, the actuator may be positioned near the mouth of fresh air duct 302 (as shown in solid lines). Alternatively, when a higher proportion of fresh air is needed, the actuator 306 may be positioned near the mouth of recirculated air duct 304 (as shown in dotted lines). In another example, in response to a request to increase water collection for a water injection system, such as water injection system 60 shown with reference to FIG. 1, the actuator 306 may be positioned near the mouth of fresh air duct 302 or near the mouth of recirculated air duct 304 depending on which source of air has a higher level of humidity relative to the other, as described in further detail below with reference to FIG. 5. Actuator 306 may be driven between the various positions by a vacuum motor (not shown). Alternatively, actuator 306 may be driven by an electric servo motor.

The appropriate mixture of fresh and recirculated air is then passed through HVAC cooling elements, configured to enable air-conditioning. Specifically, the air is passed through blower 308 and evaporator core 312 along conduit 310. Blower 308 includes a variable speed blower motor and a blower wheel or fan. Inside evaporator core 312, the evaporation of a low pressure cooling fluid or refrigerant 334 (for example, freon) into a low pressure gas causes a cooling effect which in turn cools the air flowing across it. Based on the temperature settings of the HVAC system, a suitable proportion of cold air 314, cooled by passage through evaporator core 312, may then be passed into ducting 322 and distributed to the cabin via vents 324. After exiting the evaporator core, the refrigerant vapor passes through a compressor 340, emerging as a hot compressed gas. The hot compressed refrigerant gas is subsequently passed through a condenser (not shown), becoming a cooled compressed liquid, after which it is fed through an expansion valve (not shown), becoming a cold liquid/vapor mixture, before finally being reintroduced into the evaporator core 312.

Similarly, hot air 320 may be generated by passage of fresh and/or recirculated air through HVAC heating elements, configured to enable air heating. Specifically, air is passed through a heater core 316. Engine coolant 318, which is received from the engine, is circulated through the heater core. Heater core 316 may then behave as a heat exchanger, withdrawing heat from the engine coolant and transferring the withdrawn heat to air passing across it. In this way, hot air may be generated in conduit 330 and passed into ducting 322. A climate-controlled air flow comprising a suitable amount of hot air and cold air may be generated in ducting 322, for subsequent passage to vehicle vents. Specifically, a ratio of hot air 320 to cold air 314 may be adjusted by actuator 332 responsive to selected HVAC settings. For example, when air flow of a higher temperature is requested, the actuator may be positioned near the mouth of cold air conduit 310 (as shown in dotted lines). Alternatively, when air flow of a lower temperature is requested, the actuator may be positioned near the mouth of hot air conduit 330 (as shown in solid lines). Actuator 332 may be driven by a vacuum motor or an electric servo motor (not shown). The air flow with the requested settings of flow rate and temperature may then be directed along ducting 324, 326 and/or 328 to the vehicle floor, cabin space and panels, respectively, responsive to the passenger-indicated direction of air flow. In this way, the heating and cooling elements of HVAC system 320 may be used to deliver an air flow with an appropriate ratio of hot and cold air to a requested location, with a requested flow rate, to thereby provide the vehicle passengers with a climate-controlled air flow.

Additionally, evaporator 312 is further fluidically coupled to water collection system 72, which is substantially similar to water collection system 72 shown in FIG. 1, to extract water from the HVAC system 201 for water injection into an engine, such as engine 10 shown in FIG. 1. Condensate forms at evaporator 312 as air is cooled and the condensate is then delivered to the water collection system 72 via a condensate drain (not shown) and water tank filling passage 76. An amount of condensate extracted from the evaporator 312 by water collection system 72 may be increased as the humidity of the air passing through evaporator 312 increases. Thus, by adjusting the air recirculation valve to increase an amount of air directed from an air source with a higher humidity relative to the other (e.g., air directed from the fresh air duct 302 or the recirculated air duct 304) to the evaporator 312, water collection may be increased.

In this way, the systems of FIGS. 1-3 present example systems that may be used to extract water (e.g., condensate) from an air conditioning system of an HVAC system and store collected water for injection at the engine from a water injection system. Use of a water injection system may be limited by the amount of water stored in a water storage tank. Thus, by coupling an HVAC system to a water collection system to collect water at a condenser of an air conditioner of an HVAC system, as shown in FIGS. 1-3, a water collection system may supply water for the water injection system. Collecting water for a water collection system may be adjusted in response to one or more of a water storage level, water injection demands, and various engine operating parameters, as shown in the methods presented at FIGS. 4 and 5. For example, the air recirculation valve of an HVAC system may be adjusted to collect water for the water collection system in response to a water level in a water storage tank, as shown in the methods presented at FIGS. 4 and 5.

Turning to FIG. 4, an example method 400 for injecting water into an engine is depicted. Instructions for carrying out method 400 and the rest of the methods included herein may be executed by a controller (such as controller 12 shown in FIGS. 1-2) based on instructions stored on a memory of the controller and in conjunction with signals received from sensors of the engine system, such as the sensors described above with reference to FIG. 1. The controller may employ engine actuators of the engine system to adjust engine operation, according to the methods described below. In one example, water may be injected via one or more water injectors using water stored in a water storage tank of a water injection system (such as water storage tank 63 of water injection system 60 shown in FIG. 1).

The method 400 begins at 402 by estimating and/or measuring engine operating conditions. Engine operating conditions may include manifold air pressure (MAP), air-fuel ratio (A/F), spark timing, fuel injection amount or timing, an exhaust gas recirculation (EGR) rate, mass air flow (MAF), manifold charge temperature (MCT), engine speed and/or load, an engine knock level, etc. Next, at 404, the method includes determining whether water injection has been requested. In one example, water injection may be requested in response to a manifold temperature being greater than a threshold level. Additionally, water injection may be requested when a threshold engine speed or load is reached. In yet another example, water injection may be requested based on an engine knock level being above a threshold. Further, water injection may be requested in response to an exhaust gas temperature above a threshold temperature, where the threshold temperature is a temperature above which degradation of engine components downstream of cylinders may occur. In addition, water may be injected when the inferred octane number of used fuel is below a threshold.

If water injection has not been requested, engine operation continues at 406 without injecting water. Alternatively, if water injection has been requested the method continues at 408 to estimate and/or measure water availability for injection. Water availability for injection may be determined based on the output of a plurality of sensors, such as a water level sensor and/or a water temperature sensor disposed in the water storage tank of the water injection system of the engine (such as water level sensor 65 and water temperature sensor 67 shown in FIG. 1). For example, water in the water storage tank may be unavailable for injection in freezing conditions (e.g., when the water temperature in the tank is below a threshold level, where the threshold level is at or near a freezing temperature). In another example, the level of water in the water storage tank may be below a threshold level, where the threshold level is based on an amount of water required for an injection event or a period of injection cycles. In response to the water level of the water storage tank being below the threshold level, refilling of the tank may be indicated. At 410, the method includes determining whether water is available for injection. If water is not available for injection, the method continues at 412 to adjust vehicle operating parameters to collect water. This may include collecting water from vehicle systems, such as an HVAC system as described below with regard to FIG. 5. The method at 412 may further include storing the collected water at the water storage tank. In one embodiment, additionally, the controller may send a notification to a vehicle operator to manually refill the tank. However, if water is available for injection, the method continues at 414 to inject water (stored in the water storage tank) based on the water injection request. Injecting water may include actuating, via a controller, an actuator of one or more water injectors (such as water injector 33 shown in FIG. 1) of the engine to inject water stored in the water storage tank into an intake manifold (or other location in the intake of the engine and/or in engine cylinders of the engine). Injecting water may include injecting a requested amount of water over a duration or as one or more pulses.

FIG. 5 shows an example method 500 for extracting water (e.g., in the form of condensate) from a mechanical air conditioning system of a vehicle. As described above, water for a water injection system may be collected from an on-board system, such as an HVAC system (e.g., HVAC system 201 shown in FIG. 2 and HVAC system 320 shown in FIG. 3). Extracting condensate from the HVAC system, such as HVAC system 201 shown in FIG. 2 or HVAC system 320 shown in FIG. 3, may include extracting water using a water collection system, such as the water collection system 72 shown in FIGS. 1-3.

The method 500 begins at 502 by estimating and/or measuring vehicle operating conditions. Vehicle operating conditions may include engine operating conditions, such as manifold air pressure (MAP), air-fuel ratio (A/F), spark timing, fuel injection amount or timing, water injection amount or timing, and engine speed and/or load. Other vehicle operating conditions may include a water level in a water storage tank, an AC compressor load, a position of a HVAC recirculation valve, etc. The water level in the water storage tank may be determined based on output from a sensor, such as a water tank level sensor disposed in a water storage tank of a water injection system of the engine (such as water level sensor 65 shown in FIG. 1). For example, the water level of the water storage tank may be measured via a sensor coupled inside the tank. The controller may determine the position of the HVAC recirculation valve, such as a HVAC recirculation valve of a HVAC system of a vehicle (such as HVAC recirculation valve 306 shown in FIG. 3), based on output from a sensor of the HVAC recirculation valve. Additionally, the controller may adjust the position of the HVAC recirculation valve among a plurality of positions between a mouth of an ambient air duct and a mouth of a recirculated air duct (e.g., between the paths for ambient or recirculated air flow). The controller may adjust the position of the HVAC recirculation valve based on output from various sensors, including ambient and cabin humidity sensors. In one example, the controller may adjust the HVAC recirculation valve to a position to flow recirculated air to the HVAC system. In another example, the controller may adjust the position of the HVAC recirculation valve to flow ambient air to the HVAC system. In yet another example, the controller may adjust the HVAC recirculation valve to a plurality of positions between the ambient air duct and recirculated air duct based on a desired ratio of ambient to recirculated air. For example, when a higher proportion of recirculation air is needed, the valve may be positioned close to the mouth of the fresh air duct relative to the recirculated air duct. Conversely, if a higher ratio of ambient to recirculated air is desired, the controller may adjust the position of the valve closer to the recirculated air duct relative to the fresh air duct. In yet another example, the controller may modulate the position of the HVAC recirculation valve between the position covering (e.g., at) the mouth of the ambient air duct and a position covering the mouth of the recirculated air duct to achieve a desired overall ratio of ambient to recirculated air. In this way, the controller may make a logical determination of the position (or modulation) of the HVAC recirculation valve based on logic rules that are a function of the level of water in the water reservoir, ambient humidity, and cabin humidity.

Next, at 504, the method includes determining whether the water level in the water storage tank is below a threshold level. In one example, the threshold level is based on an amount of water required (e.g., requested) for a requested injection event or a period of injection cycles. In another example, the threshold level of water in the water storage tank may be a set level that is greater than zero but less than a full water tank level. If the water level is not below the threshold level, the method continues at 506 to operate the AC compressor and adjust the recirculation valve based on passenger comfort and/or temperature settings and not water level. For example, the controller may determine the operational load of the AC compressor based on (e.g., as a function of) the operator input (e.g. a set temperature for the AC system and a current passenger compartment temperature) and not based on the water level in the water storage tank. Specifically, the controller may make a logical determination of the desired AC compressor load based on logic rules that are a function of the operator input (e.g., temperature request or on/off state of the AC system) and not the water level. Then, the controller may send a signal based on the logical determination to an actuator of the AC compressor to run the AC compressor based on the determined operational load. Further, the controller may determine the position of the HVAC recirculation valve based on operator input (e.g., requested ambient or recirculated air for the HVAC system) and not based on the water level in the water storage tank.

If, at 504, the water level is below the threshold level, the method continues at 508 to determine whether air conditioning was requested. In one example, air conditioning may be requested by a vehicle operator using a control panel in a passenger compartment of a vehicle (such as control panel 298 shown in FIG. 2). For example, the controller may receive a signal from the control panel requesting that the AC system be turned on and operated at a set temperature level. If AC has not been requested at 508, then at 510 the method includes collecting water for injection from an alternate system. The method at 510 may include extracting condensate from another water collection system of the vehicle, such as an exhaust gas recirculation system, in one example. Additionally or alternatively, the method at 510 may include indicating a refill request for the water storage tank. In one example, the controller may send a notification (e.g., a visual indication or audible signal) to the vehicle operator to manually refill the water storage tank.

If AC has been requested at 508, then at 512 the method includes determining the cabin and ambient humidity. For example, the controller may receive signals from a passenger compartment humidity sensor and an ambient air humidity sensor. Then, at 514, the method includes determining whether the cabin humidity is greater than the ambient humidity. If, at 514, the cabin humidity is not greater than the ambient humidity, the method proceeds to 516 where the method includes setting the air recirculation valve position for water collection to a first position that directs more ambient air and less recirculated air to the AC evaporator. In one example, the controller may send a signal to an actuator of the air recirculation valve to increase the amount of opening between the air recirculation valve and an opening (e.g., inlet opening) of the ambient air duct in response to the ambient air humidity being greater than the cabin humidity. For example, this may include the controller actuating the air recirculation valve to move away from the opening of the ambient air duct and towards the opening of the recirculated air duct, thereby decreasing the amount of recirculated air and increasing the amount of ambient air flowing to the evaporator. In another example, the controller may modulate the position of the air recirculation valve between a position that at least partially covers the opening of the ambient air duct and a position that at least partially covers the opening of the recirculated air duct and, during the modulation, increase the duration of opening the air recirculation valve to the ambient air duct to direct more ambient air to the AC evaporator. For example, the controller may modulate the air recirculation valve over a period of time so that a higher percentage of ambient air is traveling to the AC evaporator than recirculated air. In this way, adjusting the air recirculation valve position may include determining an amount of modulating the valve between airflow paths of the ambient and recirculated air ducts. Further, at 516, the amount of adjusting the air recirculation valve to the first position that increases the amount of ambient air directed to the AC evaporator may include adjusting the position of the air recirculation valve based on the vehicle speed. In one example, the controller may decrease the amount of opening between the air recirculation valve and the ambient air duct as the speed of the vehicle increases. In another example, the controller may decrease a duration of opening between the air recirculation valve and the ambient air duct as the speed of the vehicle increases. In this way, the amount of opening the air recirculation valve to the ambient air duct flow path may be decreased as the flow rate through the ambient air duct increases.

At 514, if the cabin humidity is greater than the ambient humidity, then the method continues at 518 to set the valve position for water collection to a second position that directs more recirculated air and less ambient air to an AC evaporator. In one example, the second position of the air recirculation valve is a position that increases the amount of opening between the air recirculation valve and an opening (e.g., inlet opening) of the recirculated air duct in response to the cabin air humidity being greater than the ambient air humidity. For example, this may include the controller actuating the air recirculation valve to move away from the opening of the recirculated air duct and towards the opening of the ambient air duct, thereby decreasing the amount of ambient air and increasing the amount of recirculated air flowing to the evaporator. In another example, the controller may modulate the position of the air recirculation valve between a position that at least partially covers the opening of the recirculated air duct and a position that at least partially covers the opening of the ambient air duct and, during the modulation, increase the duration of opening the air recirculation valve to the recirculated air duct to direct more recirculated air to the AC evaporator. For example, the controller may modulate the air recirculation valve over a period of time so that a higher percentage of recirculated air is traveling to the AC evaporator than ambient air. In this way, the set air recirculation valve position is based on which of the ambient or recirculated air has a higher relative level of humidity. For example, the controller may determine the first and the second positions based on signals received from sensors regarding the ambient humidity, the cabin humidity, the water level in a water storage tank and a water injection amount/rate. In one example, in response to sensor output about the ambient air humidity and recirculated air humidity, the controller may adjust the HVAC recirculation valve to a first position as the humidity of the ambient air increases relative to the recirculated air. Conversely, the controller may adjust the HVAC recirculation valve to a second position as the humidity of the recirculated air increases relative to the ambient air. As a result, the valve position is set to a position to that may increase the amount of water collected for a water injection system.

Additionally or alternatively, the first and second positions of the air recirculation valve may further be determined based on one or more look up tables stored in memory of a controller of the vehicle (such as controller 12 shown in FIGS. 1-2) that include a look up table of a fuel economy benefit of collecting additional water for water injection and a look up table of a fuel economy benefit of a lower humidity air source, where ambient humidity, ambient temperature, and engine coolant temperature are inputs in the first look up table and the second look up table. The fuel economy benefit of collecting additional water for water injection and the fuel economy benefit of a lower humidity air source, which are outputs of the first look up table and the second look up table respectively, are inputs in a third look up table to determine the position of the air recirculation valve based on the fuel economy benefit of collecting additional water and of a lower humidity air source. In one example, the controller may adjust the position of the air recirculation valve to a position which directs air with a greater relative humidity to the AC evaporator based on a fuel economy benefit of collecting additional water for water injection greater than the fuel economy benefit of a lower humidity air source, which is determined by the third look up table that is a function of the first and second look up tables.

Both the method at 516 and 518 continue to the method at 520 where the method includes determining a desired valve position for passenger comfort based on current cabin temperature and operator AC settings. The desired valve position for passenger comfort may be based on input signals from a vehicle operator regarding a desired passenger compartment temperature and output of a plurality of sensors, such as sensors for ambient temperature and passenger compartment temperature. For example, the controller may receive signals from an AC temperature sensor, a passenger compartment temperature sensor, and an ambient air temperature sensor. Next, at 522, the method optionally includes determining whether the valve position for water collection is the same as the position for passenger comfort. If the valve position for water collection and passenger comfort are the same at 522, the method continues at 526 and includes adjusting the valve into the desired position. In one example at 526, if the desired valve position for both water collection and passenger comfort are the first position, which directs more ambient air and less recirculated air to the AC evaporator, the controller may adjust the HVAC recirculation valve to the first position. In another example at 526, if the desired valve position for both water collection and passenger comfort are the second position, which directs more recirculated air and less ambient air to the AC evaporator, the controller may adjust the HVAC recirculation valve to the second position. However, if at 522 the desired valve positions for water collection and passenger comfort are not the same, then at 524 the method includes adjusting the valve to the desired position for water collection and cycling the AC compressor on and off based on passenger comfort and/or temperature settings. In one example, the controller may adjust the valve to the first position based on the determined humidity of the cabin air and ambient air and cycle the AC compressor on and off in order to achieve a desired passenger temperature setting. In another example, the controller may adjust the valve position for water collection to the second position and run the AC compressor based on a passenger requested temperature setting.

Both the method at 524 and the method at 526 continue at 528. The method at 528 includes running the AC compressor, collecting water from the HVAC system and storing water in the water tank. In this way, method 500 shows a method for collecting condensate from an HVAC system. During AC compressor operation, water may be collected opportunistically and stored in a water storage tank. By adjusting the valve position of a HVAC recirculation valve based on the humidity of the ambient and recirculated air, more condensate may be extracted from the HVAC system for use in the water injection system.

Figure 6:
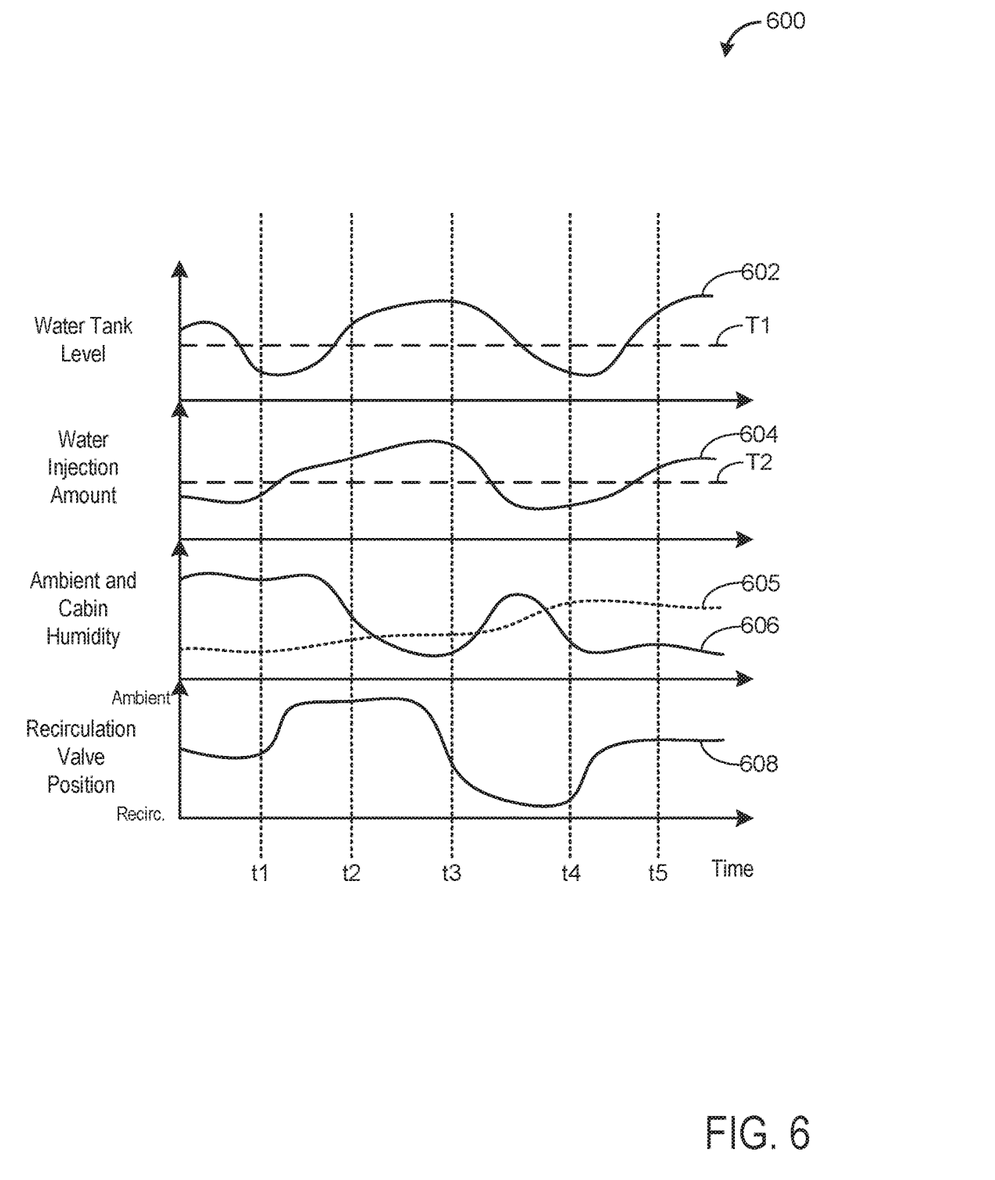
FIG. 6 shows a graph depicting adjustments to an air recirculation valve of an HVAC system in response to a water storage tank level and desired water injection amount.

Finally, FIG. 6 shows a graph 600 depicting adjustments to a position of an HVAC recirculation valve in response to a water level in a water storage tank and various engine operating conditions. The water storage tank may be a water storage tank of a water injection and water collection system, as described above. The HVAC recirculation valve may be part of an HVAC system, such as the HVAC system described above. Further, water for water injection may be collected from an AC system, as an AC compressor is run, and stored at the water storage tank. The operating parameters illustrated in the graph 600 include water tank level at plot 602, water injection amount (injected via one or more water injectors of the water injection system) at plot 604, ambient humidity at plot 606 (depicted as a solid line), cabin/passenger compartment humidity at plot 605 (depicted as a dashed line), and a commanded position of the HVAC recirculation valve at plot 608. As explained above, the HVAC recirculation valve position may include the position of the valve commanded by the controller via sending an actuation signal to the HVAC recirculation valve. The commanded positions of the HVAC recirculation valve include a first position which increases an amount of opening to an ambient air duct relative to a recirculated air duct to allow more air flow from the ambient air duct to an AC evaporator (referred to herein as the ambient duct flow path) and a second position which increases an amount of opening to the recirculated air duct relative to the ambient air duct to allow more flow from the recirculated air duct to the AC evaporator (referred to herein as the recirculated duct flow path). Thus, the HVAC recirculation valve may be adjusted to a plurality of positions between a position that is fully open to the ambient air duct and fully open to the recirculated air duct. Further, as described above, the HVAC recirculation valve may be modulated between several different positions or continuously moved to different positions between the two fully open positions. In this way, the position of the HVAC recirculation valve may be adjusted between the ambient duct and recirculated duct flow paths such that the controller may adjust a ratio of ambient to recirculated air direct to the AC system. Thresholds for various operating parameters (such as water level and water injection amount) are depicted as a dashed horizontal line. For each operating parameter, time is depicted along the horizontal axis and values of each respective operating parameter are depicted along the vertical axis.

Prior to time t1, the water level (plot 602) in the water storage tank of the water injection system decreases such that, at time t1, the water level is below a threshold T1. The water level in the water storage tank may be indicated by a water level sensor (such as water level sensor 65 shown in FIG. 1). Additionally at time t1, the AC compressor is running (e.g., the controller is operating the AC compressor in response to a request for air conditioning in a vehicle passenger compartment). In response to the water level in the water storage tank being less than the threshold T1 while the AC compressor is running, the controller adjusts the HVAC recirculation valve to collects water for the water injection system from the AC system at time t1. Since the humidity of the ambient air (plot 606) is greater than the humidity of the recirculated air (plot 605) at time t1, the controller commands the position of the HVAC recirculation valve (plot 608) to the ambient duct flow path. In one example, the controller directs all air flow from the ambient air duct path to the AC evaporator (e.g., an HVAC recirculation valve position that is fully open to the ambient duct flow path and fully closed to the recirculated duct flow path) in response the ambient air humidity greater than the recirculated air humidity. In another example, in response the ambient air humidity greater than the recirculated air humidity, the controller adjusts the position of the HVAC recirculation valve to a position between the ambient air and recirculated duct paths such that a larger portion of ambient air is directed to the AC evaporator relative to recirculated air (e.g., an HVAC recirculation valve position that is partially open to the ambient duct flow path and partially closed to the recirculated duct flow path). As a result of adjusting the HVAC position to the flow path with a higher relative humidity while the AC compressor is running, the water level in the water storage tank (plot 602) increases above the threshold T1 by time t2.

At time t3, the water level in the water storage tank (plot 602) is above the threshold T1 and the AC compressor is running. In response to the water level in the water storage tank (plot 602) being above the threshold T1, the controller may operate the AC compressor and adjust the HVAC recirculation valve based on passenger comfort and/or temperature settings and not based on the water level in the water storage tank. For example, the controller may command the HVAC recirculation valve position to the desired position for passenger comfort based on operator AC settings and a current cabin temperature. (e.g., a position of the HVAC recirculation valve that is not based on a valve position for water collection). In another example, if the water storage tank is able to store more water (e.g., the water level of the water storage tank is below an upper threshold), the controller may adjust the HVAC recirculation valve based on passenger comfort and/or temperature settings and collect water from the AC system.

From time t1 to time t3, the water injection amount (plot 604) increases. Subsequently, the water level in the water storage tank decreases between time t3 and time t4. At time t4, the water level in the water storage tank is below the threshold T1 and the AC compressor is running. In response to the water level below the threshold T1 (plot 602) while the AC compressor running, the controller may adjust the HVAC recirculation valve based on the humidity of the ambient and recirculated air to collect water for the water injection system. At time t4, the humidity of the recirculated air is higher than that of the ambient air. In response to the recirculated air having a higher level of humidity relative to the ambient air, the controller commands the position of the HVAC recirculation valve (plot 608) to the recirculated air duct flow path. In the depicted example, the controller adjusts the position of the HVAC recirculation valve to a position between the ambient air and recirculated duct paths such that a larger amount of recirculated air is directed to the AC evaporator relative to ambient air (e.g., an HVAC recirculation valve position that is partially open to the recirculated duct flow path and partially closed to the ambient duct flow path). In another example, in response the recirculated air humidity greater than the ambient air humidity, the controller directs all air flow from the recirculated air duct path to the AC evaporator (e.g., an HVAC recirculation valve position that is fully open to the recirculated duct flow path and fully closed to the ambient air duct flow path). As a result of adjusting the HVAC position to the flow path with a higher relative humidity while the AC compressor is running, the water level in the water storage tank (plot 602) increases above the threshold T1 by time t5.

In this way, the position of an HVAC recirculation valve may be adjusted to collect water from the HVAC system for a water injection system based on a water level in a water storage tank coupled to a water injection system. During AC compressor operation, the ratio of ambient to recirculated air directed to an AC evaporator may be adjusted by adjusting the position of the HVAC recirculation valve based on the humidity of the ambient and recirculated air in response to the water level being below a threshold. For example, if the humidity of the ambient air is higher relative to the recirculated air, the controller may adjust the position of the HVAC recirculation valve to a position that directs more ambient and less recirculated air to the AC evaporator. By adjusting the ratio of ambient to recirculated air directed to the AC evaporator, increased water may be collected for water injection. Additionally, if a desired HVAC valve position for water collection differs from that requested for passenger comfort, the controller may command the HVAC recirculation valve to the position desired for water collection and adjust the AC compressor load based on passenger AC settings. As a result, water for water injection may be collected as needed for a water injection system and passenger comfort may be maintained. This may reduce a likelihood of running out of water for water injection. Further, collecting water from the HVAC system in this way may reduce a burden on a vehicle operator for refilling the water storage tank. The technical effect of adjusting the position of the HVAC recirculation valve during HVAC system operation based on the water level of the water storage tank is to provide water for water injection into an engine.

As one embodiment, a method includes adjusting a position of an air recirculation valve of a HVAC system of the vehicle to vary a ratio of fresh ambient air to recirculated cabin air routed through an AC evaporator of the HVAC system based on level of water in a water reservoir coupled to a water injection system. In a first example of the method, the method further includes wherein adjusting the position of the air recirculation valve includes adjusting the position of the air recirculation valve between a first position that directs more ambient air and less cabin air through the AC evaporator and a second position that directs more cabin air and less ambient air through the AC evaporator based on the level of water, a determined ambient humidity of the ambient air, and a determined cabin humidity of the cabin air, wherein the cabin air is air from a passenger cabin of the vehicle and the ambient air is fresh air from outside of the vehicle. A second example of the method optionally includes the first example and further comprises determining the ambient humidity based on one or more of ambient temperature measured via a vehicle temperature sensor, an operational state of windshield wipers of the vehicle, and weather reports received at a controller of the vehicle via one or more of an internet connection, vehicle-to-vehicle communication, and vehicle-to-infrastructure communication. A third example of the method optionally includes one or more of the first and second examples, and further comprises determining the cabin humidity based on one or more of ambient humidity, ambient temperature, a temperature of the cabin air, air flow through the cabin, an air recirculation rate within the cabin, a number of passengers in the cabin, and a weight of passengers in the cabin. A fourth example of the method optionally includes one or more of the first through third examples, and further comprises determining a first desired position of the air recirculation valve for water collection based on the ambient humidity, cabin humidity, and level of water and determining a second desired position of the air recirculation valve for achieving a requested cabin temperature based on the requested cabin temperature, current cabin temperature, ambient humidity, and cabin humidity. A fifth example of the method optionally includes the first through fourth examples, and further comprises adjusting the air recirculation valve into the first position in response to the ambient humidity being greater than the cabin humidity. A sixth example of the method optionally includes the first through fifth examples, and further comprises cycling the AC compressor on and off to achieve the requested cabin temperature in response to the first desired position being different than the second desired position. A seventh example of the method optionally includes the first through sixth examples, and further comprises adjusting the air recirculation valve into the second position in response to the cabin humidity being greater than the ambient humidity. An eighth example of the method optionally includes the first through seventh examples, and further comprises cycling the AC compressor on and off to achieve the requested cabin temperature in response to the first desired position being different than the second desired position. A ninth example of the method optionally includes the first through eighth examples, and further comprises further comprises collecting water produced by the AC evaporator during running of the HVAC system and storing the collected water at the water reservoir. A tenth example of the method optionally includes the first through ninth examples, and further comprises injecting the water stored at the water reservoir into one or more of an intake manifold, an intake runner of an engine cylinder, and an engine cylinder via one or more water injectors of the water injection system based on engine operating conditions.

As another embodiment, a method comprises during a first condition, operating a compressor of a HVAC system of the vehicle and selectively adjusting an air recirculation valve of the HVAC system between a first position that flows fresh ambient air through an evaporator of the HVAC system and a second position that flows recirculated cabin air through the evaporator based on a water level of a water reservoir coupled to a water injection system and a temperature setting of a passenger cabin of the vehicle; and during a second condition, operating the compressor and selectively adjusting the air recirculation valve between the first position and second position based on the temperature setting and not the water level. In a first example of the method, the method further includes wherein the first condition includes when the water level is greater than a threshold water level and the second condition includes when the water level is less than the threshold water level. A second example of the method optionally includes the first example and further includes wherein adjusting the air recirculation valve during the first condition includes: adjusting the air recirculation valve into the first position in response to a first humidity of the ambient air being greater than a second humidity of the passenger cabin; and adjusting the air recirculation valve into the second position in response to the second humidity being greater than the first humidity. A third example of the method optionally includes one or more of the first and second examples, and further comprises cycling the compressor on and off to achieve the temperature setting in response to a desired position of the air recirculation valve to achieve the temperature setting being different than a desired position of the air recirculation valve for collecting water from the evaporator. A fourth example of the method optionally includes the first through third examples, and further comprises determining the second humidity of the passenger cabin based on one or more of ambient humidity, ambient temperature, a temperature of air in the passenger cabin, air flow through the passenger cabin, an air recirculation rate within the passenger cabin, a number of passengers in the passenger cabin, and a weight of passengers in the passenger cabin. A fifth example of the method optionally includes the first through fourth examples, and further includes wherein the temperature setting is a vehicle operator controlled temperature setting requesting the HVAC system to maintain the passenger cabin at the temperature setting.

As yet another embodiment, a system includes an HVAC system including an AC compressor, an AC evaporator, and an air recirculation valve adapted to adjust a ratio of fresh ambient air to recirculated cabin air routed through the AC evaporator; a water injection system including a water reservoir fluidly coupled to the AC evaporator and one or more water injectors coupled to an engine of the vehicle; and a controller including non-transitory memory with computer-readable instructions for: adjusting a position of the air recirculation valve when the AC compressor is operating based on a water level of the water reservoir, an ambient humidity of ambient air, and a cabin humidity of cabin air. In a first example of the system, the system further includes wherein the one or more water injectors are coupled to each of the water reservoir and an intake system of the engine and wherein the computer-readable instructions further include instructions for: injecting water from the water reservoir via the one or more water injectors in response to a water injection request. A second example of the system optionally includes the first example and further includes wherein the system further includes a passenger cabin, the HVAC system fluidly coupled to the passenger cabin, and wherein the computer-readable instructions further include estimating the cabin humidity based on two or more of ambient humidity, ambient temperature, a temperature of air in the passenger cabin, air flow through the passenger cabin, an air recirculation rate within the passenger cabin, a number of passengers in the passenger cabin, and a weight of passengers in the passenger cabin.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
adjusting a position of an air recirculation valve of a HVAC system of the vehicle to vary a ratio of ambient air to recirculated cabin air routed through an AC evaporator of the HVAC system based on a water level in a water reservoir coupled to a water injection system.

2. The method of claim 1, wherein adjusting the position of the air recirculation valve includes adjusting the position of the air recirculation valve between a first position that directs more ambient air and less cabin air through the AC evaporator and a second position that directs more cabin air and less ambient air through the AC evaporator based on the water level, a determined ambient humidity of the ambient air, and a determined cabin humidity of the cabin air, wherein the cabin air is air from a passenger cabin of the vehicle and the ambient air is fresh air from outside of the vehicle.

3. The method of claim 2, further comprising determining the first position and the second position of the air recirculation valve based on a fuel economy benefit of an increased water level in the water reservoir and a fuel economy benefit of a lower humidity air source, wherein the fuel economy benefit of the increased water level in the water reservoir is based on a first look up table stored in memory of a controller of the vehicle and the fuel economy benefit of the lower humidity air source is based on a second look up table stored in the memory, where ambient humidity, ambient temperature, and engine coolant temperature are inputs in the first look up table and the second look up table.

4. The method of claim 2, further comprising determining the ambient humidity based on one or more of ambient temperature measured via a vehicle temperature sensor, an operational state of windshield wipers of the vehicle, and weather reports received at a controller of the vehicle via one or more of an internet connection, vehicle-to-vehicle communication, and vehicle-to-infrastructure communication.

5. The method of claim 2, further comprising determining the cabin humidity based on one or more of ambient humidity, ambient temperature, a temperature of the cabin air, air flow through the cabin, an air recirculation rate within the cabin, a number of passengers in the cabin, and a weight of passengers in the cabin.

6. The method of claim 2, further comprising determining a first desired position of the air recirculation valve for increased water collection based on the ambient humidity, cabin humidity, and the water level and determining a second desired position of the air recirculation valve for achieving one or more of a requested cabin temperature and humidity based on the requested cabin temperature, current cabin temperature, ambient humidity, and current cabin humidity.

7. The method of claim 6, further comprising adjusting the air recirculation valve into the first position in response to the ambient humidity being greater than the cabin humidity.

8. The method of claim 7, further comprising cycling an AC compressor of the HVAC system on and off to achieve one or more of the requested cabin temperature and humidity in response to the first desired position being different than the second desired position.

9. The method of claim 6, further comprising adjusting the air recirculation valve into the second position in response to the cabin humidity being greater than the ambient humidity.

10. The method of claim 9, further comprising cycling the AC compressor on and off to achieve the requested cabin temperature in response to the first desired position being different than the second desired position.

11. The method of claim 1, further comprising collecting water produced by the AC evaporator during running of the HVAC system, storing the collected water at the water reservoir, and injecting the water stored at the water reservoir into one or more of an intake manifold, an intake runner of an engine cylinder, and the engine cylinder via one or more water injectors of the water injection system based on engine operating conditions.

12. A method for a vehicle, comprising:
during a first condition, operating a compressor of a HVAC system of the vehicle and selectively adjusting an air recirculation valve of the HVAC system between a first position that flows fresh ambient air through an evaporator of the HVAC system and a second position that flows recirculated cabin air through the evaporator based on a water level of a water reservoir coupled to a water injection system and a temperature setting of a passenger cabin of the vehicle; and
during a second condition, operating the compressor and selectively adjusting the air recirculation valve between the first position and the second position based on the temperature setting and not the water level.

13. The method of claim 12, wherein the first condition includes when the water level is less than a threshold water level and the second condition includes when the water level is greater than the threshold water level.

14. The method of claim 12, wherein adjusting the air recirculation valve during the first condition includes:
adjusting the air recirculation valve into the first position in response to a first humidity of the ambient air being greater than a second humidity of the passenger cabin; and
adjusting the air recirculation valve into the second position in response to the second humidity being greater than the first humidity.

15. The method of claim 14, further comprising cycling the compressor on and off to achieve the temperature setting in response to a desired position of the air recirculation valve to achieve the temperature setting being different than a desired position of the air recirculation valve for collecting water from the evaporator.

16. The method of claim 14, further comprising determining the second humidity of the passenger cabin based on one or more of ambient humidity, ambient temperature, a temperature of air in the passenger cabin, air flow through the passenger cabin, an air recirculation rate within the passenger cabin, a number of passengers in the passenger cabin, and a weight of passengers in the passenger cabin.

17. The method of claim 12, wherein the temperature setting is a vehicle operator controlled temperature setting requesting the HVAC system to maintain the passenger cabin at the temperature setting; and wherein the adjusting the air recirculation valve is via computer-readable instructions stored in non-transitory memory of a controller.

18. The method of claim 1, further comprising adjusting the position of the air recirculation valve based on a temperature setting of a passenger cabin of the vehicle and not the water level.

19. The method of claim 18, wherein the adjusting includes when the water level is greater than a threshold water level.

* * * * *